(12) United States Patent
Yang

(10) Patent No.: US 7,159,631 B2
(45) Date of Patent: Jan. 9, 2007

(54) PROTECTIVE COVER FOR MOTOR VEHICLE

(75) Inventor: Ming-Shun Yang, Taipei (TW)

(73) Assignee: Formosa Sounding Corp., Taipei (TW)

( * ) Notice: Subject to any disclaimer, the term of this patent is extended or adjusted under 35 U.S.C. 154(b) by 0 days.

(21) Appl. No.: 10/649,810

(22) Filed: Aug. 28, 2003

(65) Prior Publication Data

US 2005/0045255 A1   Mar. 3, 2005

(51) Int. Cl.
*B65D 65/02*  (2006.01)
*B65D 85/00*  (2006.01)

(52) U.S. Cl. .......... 150/166; 135/88.05; 206/135; 296/136.12; 296/136.13

(58) Field of Classification Search ........ 150/154, 150/166, 168, 167; 206/335; 296/136.01, 296/136.07, 136.11–136.13, 95.1; 135/88.05, 135/88.07
See application file for complete search history.

(56) References Cited

U.S. PATENT DOCUMENTS

| | | | | |
|---|---|---|---|---|
| 2,950,749 A * | 8/1960 | MacDonald | .............. | 150/166 |
| 3,929,145 A * | 12/1975 | Schroeder | .............. | 135/128 |
| 5,024,262 A * | 6/1991 | Huang | .............. | 160/370.21 |
| 5,035,460 A * | 7/1991 | Huang | .............. | 296/95.1 |
| 5,163,461 A * | 11/1992 | Ivanovich et al. | .............. | 135/126 |
| 5,188,417 A * | 2/1993 | Curchod | .............. | 296/136.04 |
| 5,343,887 A * | 9/1994 | Danaher | .............. | 135/156 |
| 5,725,933 A * | 3/1998 | Nishiyama | .............. | 428/192 |
| 5,816,641 A * | 10/1998 | Chen | .............. | 296/95.1 |
| 5,845,958 A * | 12/1998 | Rudys et al. | .............. | 296/136.08 |
| 5,927,793 A * | 7/1999 | McGrath, Jr. | .............. | 296/136.13 |
| 6,003,929 A * | 12/1999 | Birdsell | .............. | 296/100.16 |
| 6,196,587 B1 * | 3/2001 | Sage | .............. | 280/770 |
| 6,220,648 B1 * | 4/2001 | Daniel | .............. | 296/136.02 |
| 6,485,086 B1 * | 11/2002 | McGrath, Jr. | .............. | 296/136.13 |
| 6,644,716 B1 * | 11/2003 | McNabb | .............. | 296/95.1 |
| 6,811,204 B1 * | 11/2004 | Long | .............. | 296/102 |

* cited by examiner

*Primary Examiner*—Sue A. Weaver
(74) *Attorney, Agent, or Firm*—Troxell Law Office, PLLC

(57) ABSTRACT

A protective cover for motor vehicle mainly includes a cover, at least two flexible metal rings that are lengthwise sequentially spaced at and attached to an inner side of the cover to enclose a relatively large area of the cover, and adjustable belts with hook belt fasteners spaced at a lower edge of the cover. The flexible metal rings are adapted to automatically stretch the cover for covering an upper part of a motor vehicle, and the hook belt fasteners are adapted to firmly hold the cover to a lower part of the motor vehicle. To fold and store the cover, simply fold the cover to align the metal rings with each other, and bend the aligned metal rings into several superposed smaller loops, so that the folded cover may be stored in a bag in the flat and folded state to occupy only a relatively small space.

14 Claims, 8 Drawing Sheets

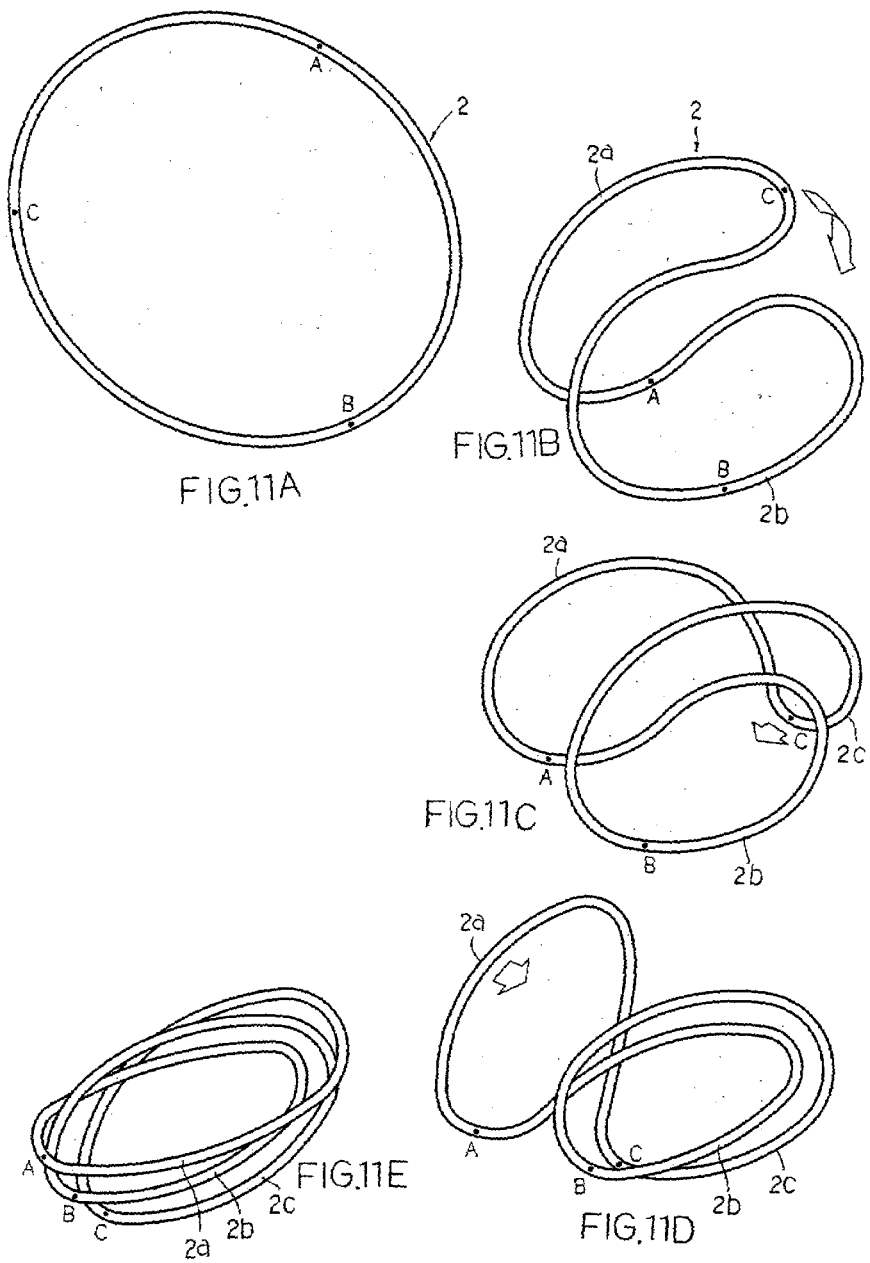

"PROTECTIVE COVER FOR MOTOR VEHICLE"

FIELD OF THE INVENTION

The present invention relates to a protective cover for motor vehicle, and more particularyly to a protective cover for motor vehicle that may be quickly stretched for use and quickly folded into a largely reduced volume for storage.

BACKGROUND OF THE INVENTION

Most motor vehicles, such as various types of automobiles, yachts, etc., would require a protective cover to protect them from accumulated dust, strong sunshine, rainwater, snow, etc.

Conventionally, the protective cover for motor vehicle is made of a soft, waterproof fabric cut and sewed into a shape corresponding to the vehicle to be protected.

Since the protective cover is completely made of a soft material, it is impossible for the protective cover to automatically stretch for use. A user has to manually extend different parts of the cover one by one, and pull these parts to corresponding positions on the motor vehicle to complete the covering of the vehicle with the protective cover. The cover is then finally fastened to the motor vehicle. Since the motor vehicle usually has a relatively large volume, it is apparently time and effort consuming to manually extend and pull different parts of the protective cover to correctly cover corresponding areas on the motor vehicle. This is the disadvantage in handling the conventional protective cover for motor vehicle.

On the other hand, it is also very inconvenient to fold the protective cover for storage. That is, the user has to manually fold different parts of the protective cover. There is not any object for fixing the folded cover to a fixed shape. The protective cover could only be roughly wound into a roll that usually occupies a relatively large space.

It is therefore tried by the inventor to develop a protective cover for motor vehicle that may be conveniently stretched for use or folded into a relatively small volume for storage.

SUMMARY OF THE INVENTION

A protective cover for motor vehicle according to the present invention mainly includes a cover for covering an upper part, all side windows, the engine hood, and the trunk lid of the motor vehicle, at least two flexible metal rings that are lengthwise sequentially spaced at and attached to an inner side of the cover and have substantially the same shape and area to enclose a relatively large area of the cover, and a plurality of adjustable belts with hook belt fasteners spaced at a lower edge of the cover. An inherent flexibility and elasticity of the flexible metal rings automatically stretches the cover for covering the upper part and the side windows of the motor vehicle, and the hook belt fasteners are adapted to firmly hold the stretched cover to a lower part of the motor vehicle. To fold and store the cover, simply fold the cover to align the metal rings with each other, and bend the aligned metal rings into three superposed smaller loops, and then position the cover and the metal rings in a bag in the flat and folded state to occupy only a relatively small space. The bag may then be conveniently carried or stored in the trunk.

To use the protective cover, simple remove the cover and metal rings from the bag, and the flexible metal rings would automatically stretch the cover for use.

BRIEF DESCRIPTION OF THE DRAWINGS

The structure and the technical means adopted by the present invention to achieve the above and other objects can be best understood by referring to the following detailed description of the preferred embodiments and the accompanying drawings, where in FIG. 1 is a top plan view showing a protective cover for motor vehicle according to an embodiment of the present invention is covered on a car;

FIGS. 11A–11E illustrate an example of folding the flexible metal ring of the protective cover of the present invention to fold the protective cover into a small volume;

DETAILED DESCRIPTION OF THE PREFERRED EMBODIMENTS

Figure 1:
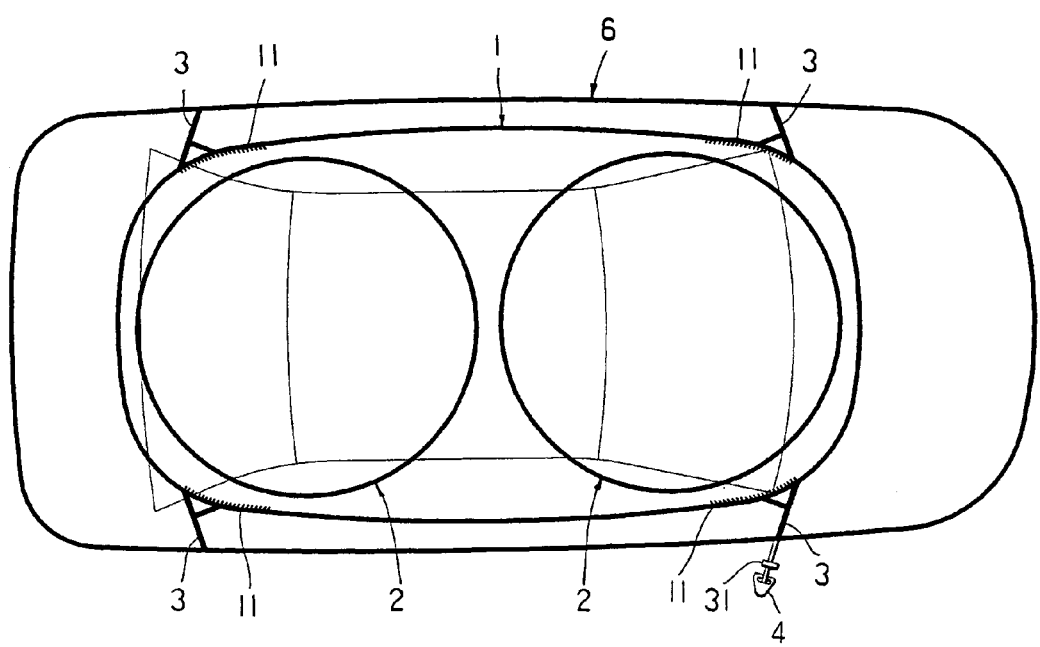
Figure 2:
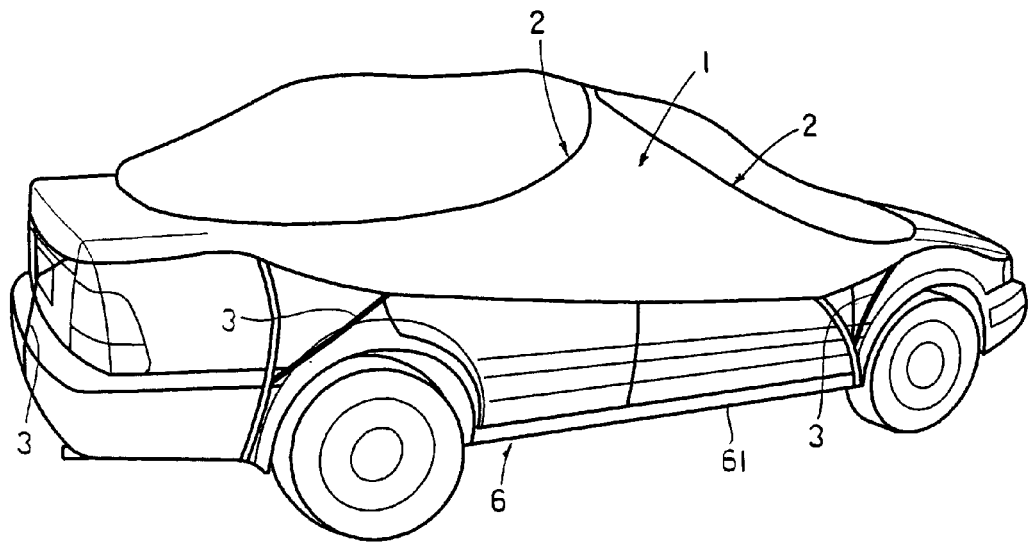
FIG. 2 is a rear perspective view of FIG. 1.
Figure 3:
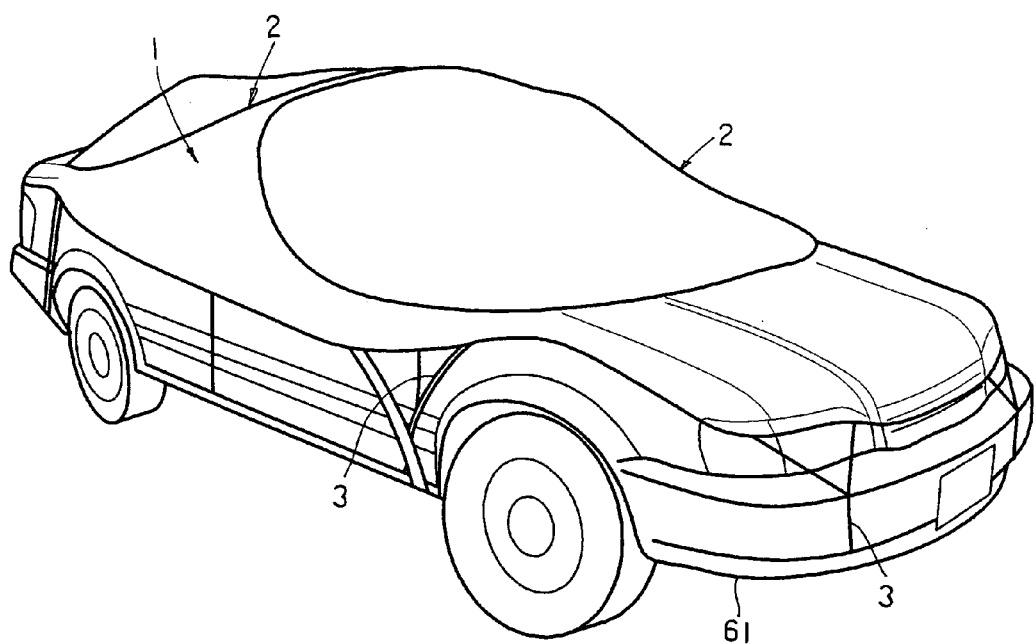
FIG. 3 is a front perspective view of FIG. 1.

Please refer to FIGS. 1, 2, and 3 that are top plan, rear perspective, and front perspective views, respectively, of a protective cover for motor vehicle according to an embodiment of the present invention covered on a motor vehicle.

Figure 7:
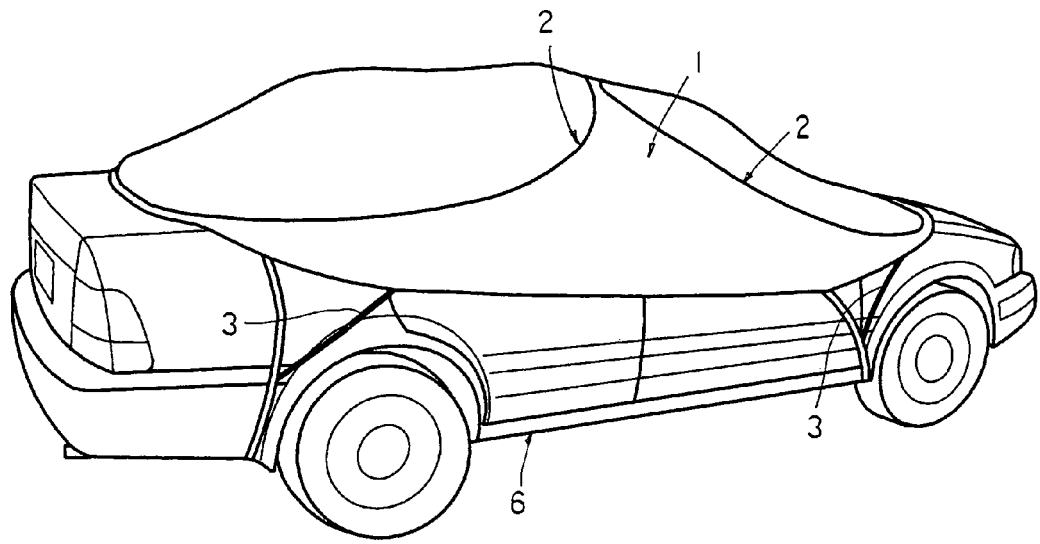
FIG. 7 is a rear perspective view showing the protective cover of the present invention is used to cover a sedan.
Figure 8:
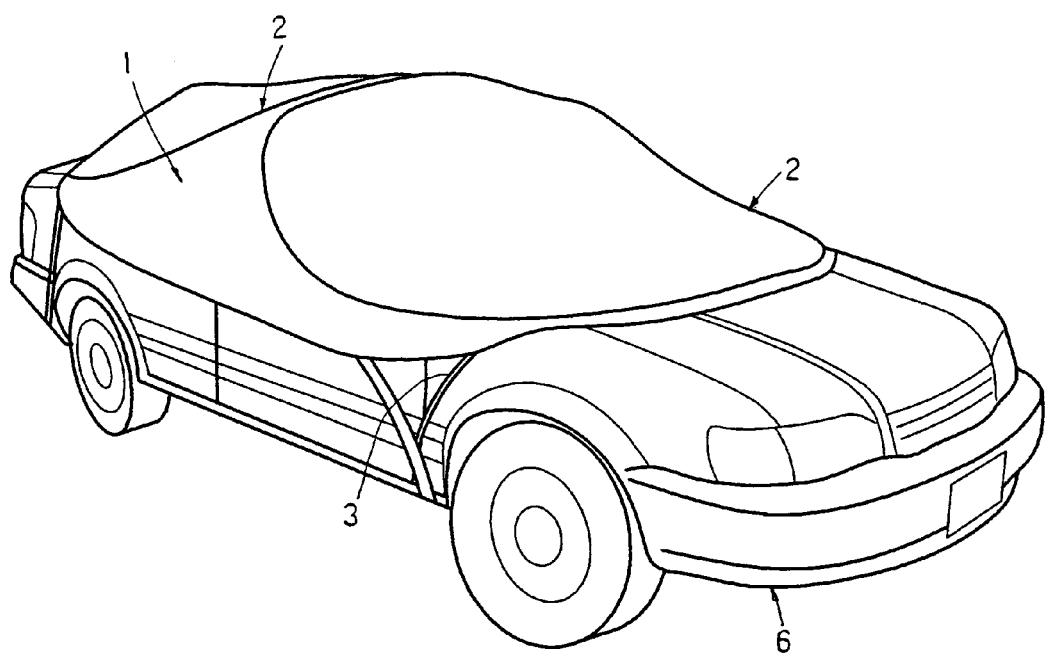
FIG. 8 is a front perspective view of FIG. 7.

As shown, the protective cover for motor vehicle according to the present invention mainly includes a cover (1) being formed by cutting and sewing a waterproof fabric into a shape corresponding to an upper part of a motor vehicle (6). The cover (1) has an overall area preferably large enough to cover all portions at the upper part of the motor vehicle (6) that are to be protected. In the embodiment of the present invention shown in FIGS. 1 to 3, the cover (1) covers the windshield, the roof, the rear window, and all side windows of the motor vehicle (6). In another embodiment of the present invention as shown in FIGS. 7 and 8, the cover (1) further covers the engine hood and the trunk lid of the motor vehicle (6). There are at least two flexible metal rings (2) having the same or similar size and shape being lengthwise sequentially spaced on and attached to the cover (1). The metal rings (2) enclose a relatively large part of a whole area of the cover (1), such that, for example, an area enclosed in the first metal ring (2) would cover the windshield and a front half of the roof of the motor vehicle (6), and an area enclosed in the second metal ring (2) would cover the rear window and a rear half of the roof of the motor vehicle (6) when the protective cover (1) is used to cover the motor vehicle (6). The flexible metal rings (2) also serve to support the whole cover (1). A plurality of adjustable belts (3) are provided on the cover (1) along a lower edge thereof at predetermined positions, such as four corners thereof. Each of the adjustable belts (3) is provided at a free end with a hook belt fastener (4).

The lower edge of the cover (1) is provided at, for example, four corners thereof with elastic bends (11) to elastically bind the cover (1) to the upper part of the motor vehicle (6). The adjustable belts (3) may be otherwise in the form of elastic cords for the hook belt fasteners (4) to adjustable connect thereto.

Figure 4:
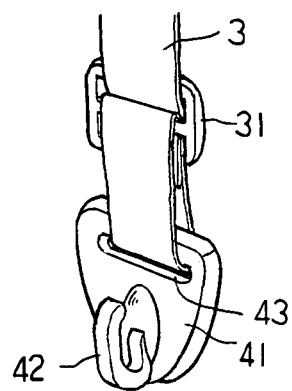
FIG. 4 is a perspective view of a hook belt fastener attached to the protective cover for motor vehicle according to the present invention.

FIG. 4 is a perspective view showing the adjustable belt (3) and the hook belt fastener (4) connected thereto. As shown, the adjustable belt (3) includes a buckle (31) for adjusting an overall length of the belt (3). The hook belt fastener (4) includes a plate (41) and an upward extended hook (42) provided at one side of the plate (41). The plate (41) is provided at a predetermined position with a through hole (43), through which the free end of the adjustable belt (3) is extended to adjustably connect to the buckle (31). When the protective cover is unfolded for use, the hook belt fasteners (4) may be hooked to a lower part of the motor vehicle (6).

Figure 5:
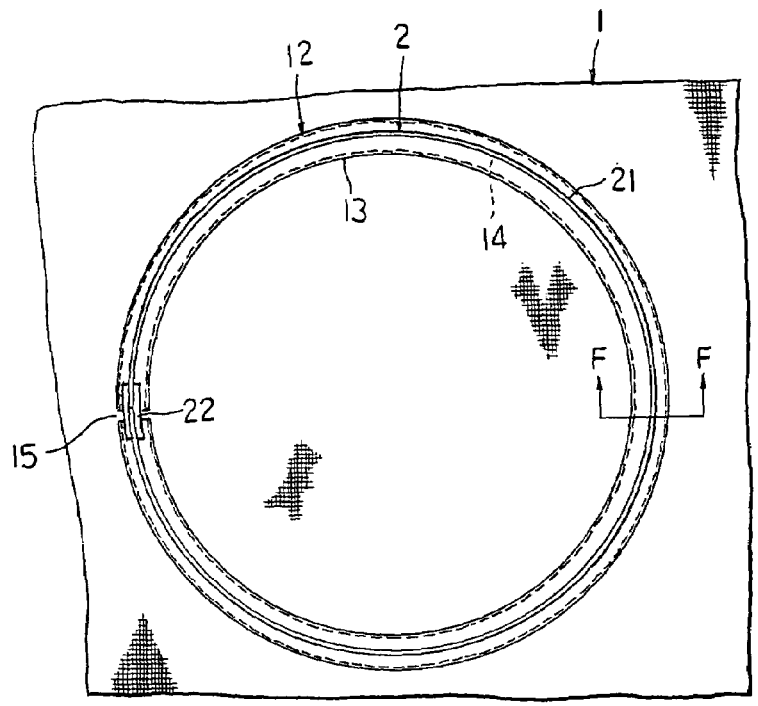
FIG. 5 is a fragmentary plan view showing an area of the protective cover of the present invention provided with a flexible metal ring.
Figure 6:
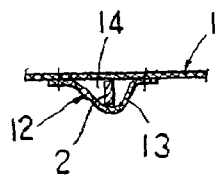
FIG. 6 is a cross sectional view taken along line F—F of FIG. 5.

FIG. 5 is a plan view showing one of the flexible metal rings (2) and the manner in which the metal ring is connected to the cover (1). And, FIG. 6 is a cross sectional view taken along line F-F of FIG. 5. As can be seen from FIGS. 5 and 6, the flexible metal ring (2) is made of a flexible metal material and attached to the cover (1) in any workable manner. For example, two long strips of cloth (13) having a predetermined width are sewed along two longitudinal edges onto two selected positions at an inner side of the cover (1), so that two annular sleeves (12) are formed on the cover (1) to define two tubular spaces (14) between the cloth strips (13) and the cover (1). The cloth selected for making the sleeve (12) is soft in touch but has a tough texture. An opening (15) is provided on each of the sleeves (12). The flexible metal ring (2) includes a flexible metal wire (21) and a tubular connector (22). The metal wire (21) is extended at an end into the sleeve (12) via the opening (15), so that the metal wire passes through and comes out of the sleeve (12) via the opening (15) again. The tubular connector (22) receives and is tightly riveted to two ends of the metal wire (21), so as to bind the metal wire (21) into a flexible metal ring (2) received in the sleeve (12).

As having been mention above, FIGS. 7 and 8 are rear and front perspective views, respectively, showing the protective cover of the present invention is covered on an upper part of a motor vehicle (6), which is a sedan (61) in the illustrated drawing. As shown, when the cover (1) is fully extended for use, the flexible metal rings (2), due to an inherent flexibility and elasticity thereof, automatically extend to stretch open the whole cover (1) for covering the upper part, including the roof, the engine hood, the windshield, the rear window, the trunk lid, and all side windows of the sedan (61). The hook belt fasteners (4) at the free ends of the adjustable beltw (3) may then be hooked to the lower part of the sedan (61). The protective cover may therefore be very easily, conveniently, and quickly extended without the need of handling different parts one by one to stretch the whole protective cover.

Figure 9:
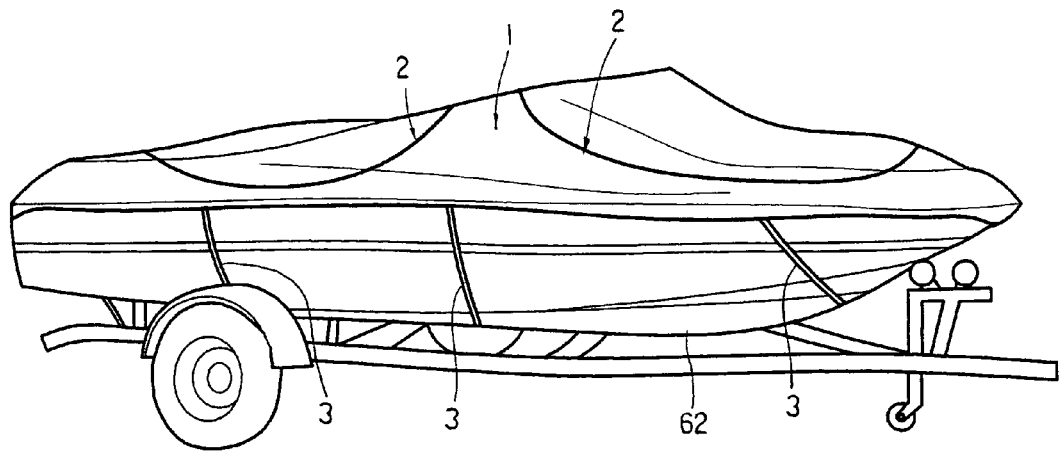
FIG. 9 is a perspective view showing the protective cover of the present invention is used to cover a yacht.
Figure 10:
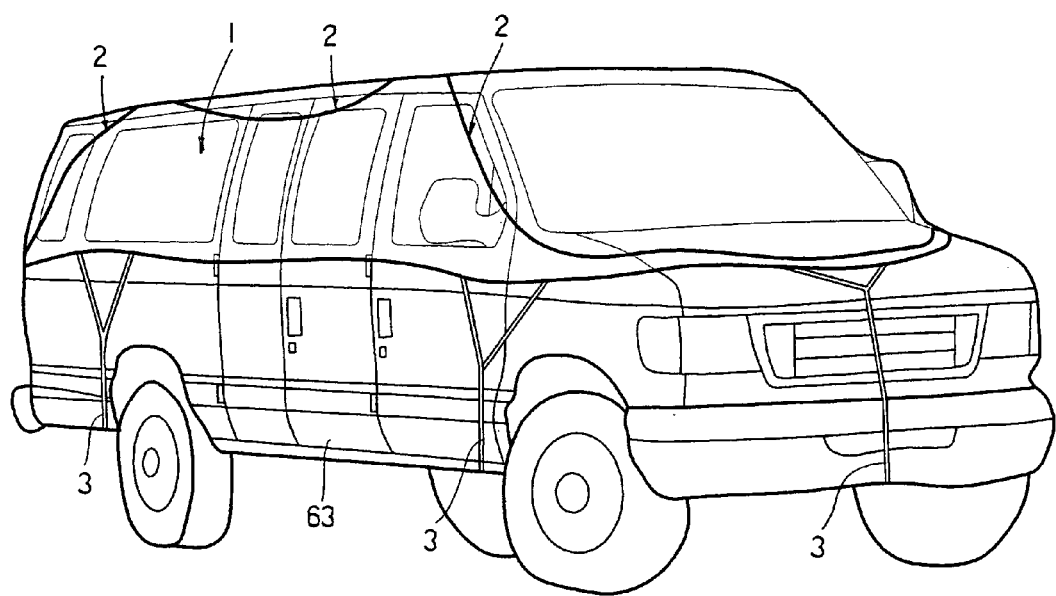
FIG. 10 is a perspective view showing the protective cover of the present invention is used to cover a station wagon.
Figure 12A:
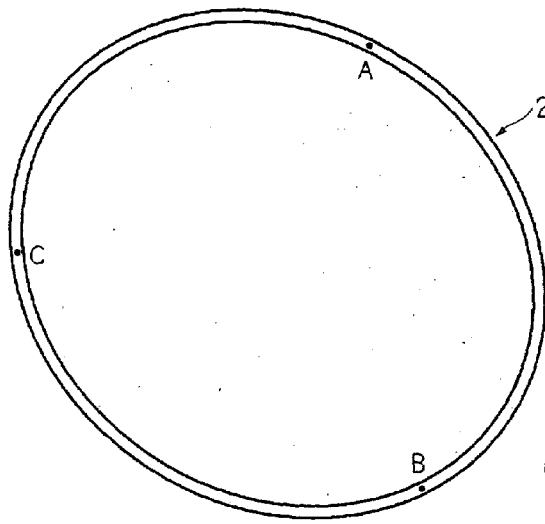
FIGS. 12A–12E illustrate another example of folding the flexible metal ring of the protective cover of the present invention to fold the protective cover into a small volume.
Figure 12B:
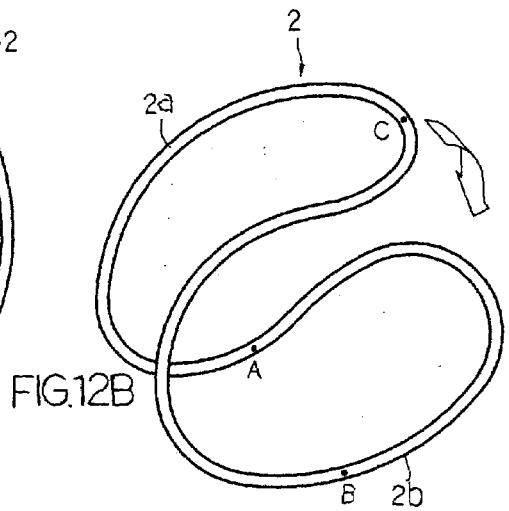
Figure 12C:
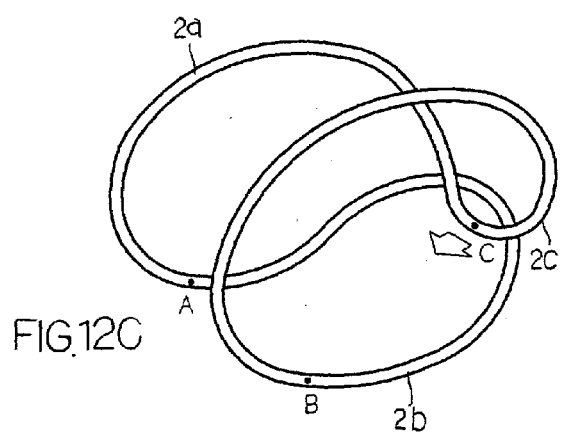
Figure 12E:
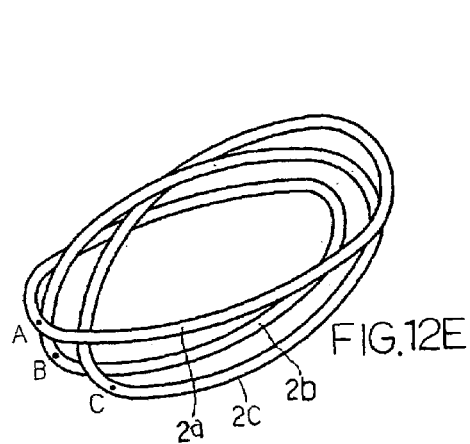
Figure 12D:
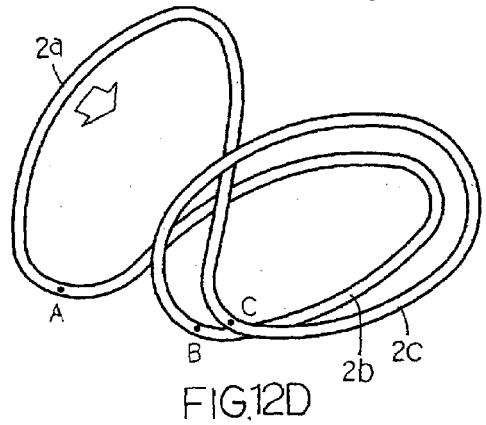

In the present invention, the term "motor vehicle" (6) has a broad meaning to include automobiles, cars, yachts, vans, station wagons, etc. FIGS. 7 and 8 show an embodiment of the protective cover of the present invention is used to cover a sedan (61), FIG. 9 shows another embodiment of the protective cover (1) is used to cover a yacht (62), and FIG. 10 shows a further embodiment of the cover (1) is used to cover a station wagon (63). In the embodiment shown in FIG. 10, since the station wagon (63) usually has a relatively long body, the protective cover (1) has three flexible metal rings (3) provided thereto to fully stretch the length-increased cover (1) for sufficiently cover the upper part of the station wagon (63). That is, the protective cover of the present invention may have an increased number of flexible metal rings (2) depending on an actual length of a motor vehicle to be protected.

However, in the present invention, the use of only one flexible metal ring (2) is not considered. If only one metal ring (2) were use, the metal ring (2) must have a large diameter in order to cover the whole upper part, including all the side windows, of the motor vehicle. The large-sized metal ring (2) would have area and volume that are too large to be conveniently folded by only one person. Moreover, the metal ring (2) would project from two lateral sides of the motor vehicle by a relatively large distance to present the cover (1) from fitly and tightly covering the motor vehicle body. When two of more metal rings (2) are adopted for use, they may have a diameter within an overall width between two fully stretched hands of a person, so that the protective cover may be advantageously handled, including extending and folding of the cover, only by one person.

FIGS. 11A to 13 explains the manner of folding the protective cover of the present invention. To enable a clear description, only the folding of the flexible metal ring (2) is shown in FIGS. 11A and 12A, and letters "A", "B", and "C" are marked on the metal ring (2) to better indicate changes and movements of different parts of the metal ring (2) in the process of folding the same.

Figure 13:
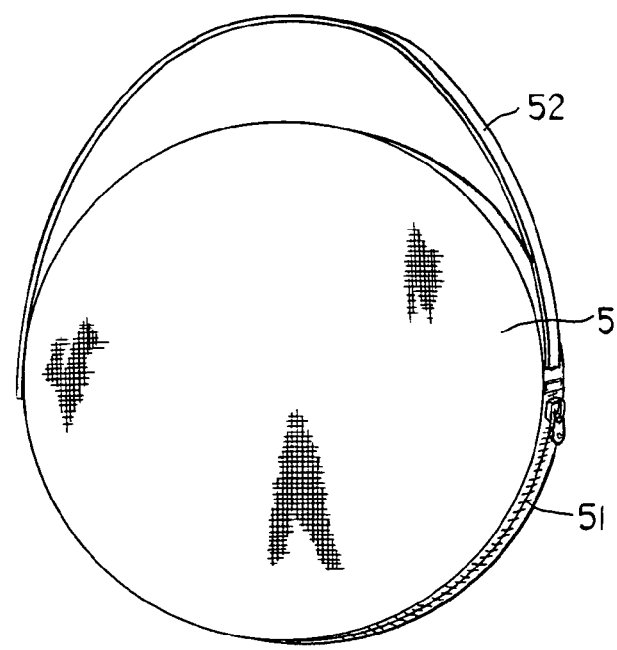
FIG. 13 shows the folded protective cover of the present invention is conveniently stored in a bag.

Please refer to FIGS. 11A–11E. To fold the whole protective cover, first fold the cover (1) so that the two flexible metal rings (2) are superposed and aligned with each other, as shown in FIG. 11A. Then, pull and band one part of the superposed metal ring (2), for example, the part indicated with the letter "C", toward an opposite side of the metal ring. At this point, the remaining parts of the metal ring (2) would naturally be pulled in a direction indicated by the arrow, so that a first small loop (2a) and a second small loop (2b) are formed, as shown in FIG. 11B. Keep pulling the flexible metal ring (2) at the part C, so that a third small loop (2c) is gradually formed between the first and the second small loops (2a), (2b), as shown in FIG. 11C. Gradually expand the third small loop (2c) and locate it behind the second small loop (2b), as shown in FIG. 11D. Fully superpose the three connected small loops in the sequence of 2a-2b-2c to have a flat profile, as shown in FIG. 11E. Finally, as shown in FIG. 13, the protective cover with the flexible metal rings (2) fully folded into three superposed small loops is positioned into a flat bag (5) having a shape corresponding to the fully folded protective cover. The bag (5) includes a zipper (51) to open and close the bag (5), and a shoulder strap (51) or a handle (not shown) for convenient carrying of the bag (5), which may be then positioned in the trunk of the motor vehicle.

FIGS. 12A–12E show another manner of folding the flexible metal ring (2). This manner is generally similar to the manner illustrated in FIG. 11, except that the third small loop (2c) is located between the first and the second small loop (2a), (2b) to superpose in the sequence of 2a-2c-2b and have a flat profile.

Although the manner of folding the protective cover is illustrated in several separated steps, the folding movements can actually be continuously operated to complete the folding quickly. Particularly, the flexible metal rings (2) automatically guide the protective cover to fold into a flat profile to largely reduce the volume of the cover and accordingly facilitate convenient carrying or storage of the protective cover.

To use the protective cover again, simply remove the folded cover from the bag (5), and the whole protective cover automatically stretches from the folded state due to the inherent flexibility and elasticity of the metal rings (2).

In brief, the present invention provides a protective cover for motor vehicle that may be conveniently stretched for use and folded for storage, and has a largely reduced volume after being folded.

What is claimed is:

1. A protective cover for a motor vehicle comprising:
   a cover assembly selectively movable between open and closed positions and having:
   a) a cover;
   b) a plurality of adjustable belts, each adjustable belt of the plurality of adjustable belts being attached at a first end thereof to the periphery of the cover and having a hook belt fastener connected to a second end thereof;
   c) at least two annular sleeves, each of the at least two annular sleeves being spaced apart from an adjacent annular sleeve and spaced apart from the periphery of the cover; and
   d) at least two flexible metal rings, one metal ring of the at least two flexible metal rings being positioned with in each of the at least two annular sleeves, wherein the at least two flexible metal rings comprise a first circular ring configured to support the cover over a front half of the motor vehicle and a second circular ring configured to support the cover over a back half of the motor vehicle.

2. The protective cover according to claim 1, wherein each of the each of the at least two annular sleeves includes a strip of cloth sewn to a bottom surface of the cover and forming a tubular space between the strip of cloth and the cover, one metal ring of the at least two flexible metal rings is located in each tubular space.

3. The protective cover according to claim 1, wherein each of the each of the at least two annular sleeves includes an opening, one metal ring of the at least two flexible metal rings is selectively inserted and removed through each opening.

4. The protective cover according to claim 1, wherein the cover is made of a waterproof fabric.

5. The protective cover according to claim 1, wherein the cover has a size large enough to cover parts of the motor vehicle selected from a group consisting of an engine hood, a windshield, a roof, a rear window, a trunk lid, side windows, and any combination thereof.

6. The protective cover according to claim 1, wherein the at least two flexible metal rings are spaced apart along a length of the cover.

7. The protective cover according to claim 1, wherein each metal ring of the at least two flexible metal rings has a flexible metal wire and a tubular connector connected to each of two opposing ends of the flexible metal wire.

8. The protective cover according to claim 1, wherein each of the plurality of adjustable belts is an extendable elastic cord.

9. The protective cover according to claim 1, wherein each of the plurality of adjustable belts has a buckle.

10. The protective cover according to claim 1, wherein each hook belt fastener has a plate having a hook and a through hole.

11. The protective cover according to claim 1, further comprising a plurality of elastic cords spaced apart and located on a selected peripheral portion of a periphery of the cover, one elastic cord of the plurality of elastic cords allowing each selected peripheral portion to be selectively moved between a retracted position and an expanded position.

12. The protective cover according to claim 1, further comprising a flat profiled bag, the cover assembly being selectively stored in the flat profiled bag when in the closed position.

13. The protective cover according to claim 12, wherein the flat profiled bag includes a shoulder strap.

14. The protective cover according to claim 1, wherein the at least two metal rings are configured to be aligned and folded into three smaller superimposed loops when the cover is in the closed position.

* * * * *